US012703365B2

(12) United States Patent
Martin et al.

(10) Patent No.: US 12,703,365 B2
(45) Date of Patent: Aug. 11, 2026

(54) HYDRAULIC DRIVE SYSTEM AND METHODS FOR AN AGRICULTURAL VEHICLE

(71) Applicant: CNH Industrial America LLC, New Holland, PA (US)

(72) Inventors: Jethro Martin, Ephrata, PA (US); Michael Patrick Rush, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 71 days.

(21) Appl. No.: 18/443,561

(22) Filed: Feb. 16, 2024

(65) Prior Publication Data

US 2025/0263077 A1 Aug. 21, 2025

(51) Int. Cl.

| | |
|---|---|
| ***B60W 30/188*** | (2012.01) |
| ***A01B 69/04*** | (2006.01) |
| ***B60W 50/04*** | (2006.01) |
| *B60W 50/00* | (2006.01) |

(52) U.S. Cl.

CPC ......... *B60W 30/188* (2013.01); *A01B 69/008* (2013.01); *B60W 50/045* (2013.01); *B60W 2050/0044* (2013.01); *B60W 2300/15* (2013.01); *B60W 2300/44* (2013.01); *B60W 2520/06* (2013.01); *B60W 2520/26* (2013.01); *B60W 2555/20* (2020.02)

(58) Field of Classification Search

CPC ............. B60W 30/188; B60W 50/045; B60W 2050/0044; B60W 2300/15; B60W 2300/44; B60W 2520/06; B60W 2520/26; B60W 2555/20; A01B 69/008

See application file for complete search history.

(56) References Cited

U.S. PATENT DOCUMENTS

| | | | | |
|---|---|---|---|---|
| 6,321,866 | B1 * | 11/2001 | Prohaska | F16H 48/18 180/197 |
| 7,121,374 | B1 * | 10/2006 | Ho | F16H 61/421 180/242 |
| 7,172,046 | B2 | 2/2007 | Ho et al. | |
| 9,255,639 | B2 | 2/2016 | Dueckinghaus et al. | |
| 10,440,886 | B2 | 10/2019 | Bollin et al. | |
| 10,836,426 | B1 * | 11/2020 | Busboom | B62D 11/04 |
| 2006/0243516 | A1 * | 11/2006 | Ho | B60K 28/16 180/242 |

(Continued)

*Primary Examiner* — Sze-Hon Kong

(74) *Attorney, Agent, or Firm* — Dority & Manning, P.A.

(57) ABSTRACT

A drive system for an agricultural vehicle is provided herein that may include a pump unit that may be connected to a power plant and configured to generate power through a flow of hydraulic fluid. A first propulsion motor may be fluidly coupled with a pump unit and configured to drive a first tractive force to a first tractive element by applying a first control signal. A sensor system may be configured to capture data indicative of a slip condition of the first tractive element. A computing system may be operably coupled with the sensor system and the first propulsion motor. The computing system may be configured to detect a slip condition of the first tractive element based on the data from the sensor system and provide a superimposed traction signal to the first tractive element to alter a displacement to the first control signal line.

19 Claims, 4 Drawing Sheets

(56) References Cited

U.S. PATENT DOCUMENTS

2008/0141670 A1* 6/2008 Smith ................. F16H 61/4035
60/484
2013/0111893 A1* 5/2013 Edward ................. F16H 61/456
60/484
2013/0160436 A1* 6/2013 Scheibel .................. B60K 6/12
60/327
2016/0347364 A1* 12/2016 Eavenson, Sr. ........ B62D 11/04
2017/0066447 A1* 3/2017 Hertel ................... B60W 10/02
2017/0314675 A1* 11/2017 Mayer .................... B60K 23/04
2019/0135262 A1* 5/2019 Gaither ................. B60W 20/10
2023/0013377 A1* 1/2023 Horiguchi ............. B60W 50/10
2024/0174080 A1* 5/2024 Jutkowitz ................ B60K 6/52
2025/0263077 A1* 8/2025 Martin ................. A01B 69/008

* cited by examiner

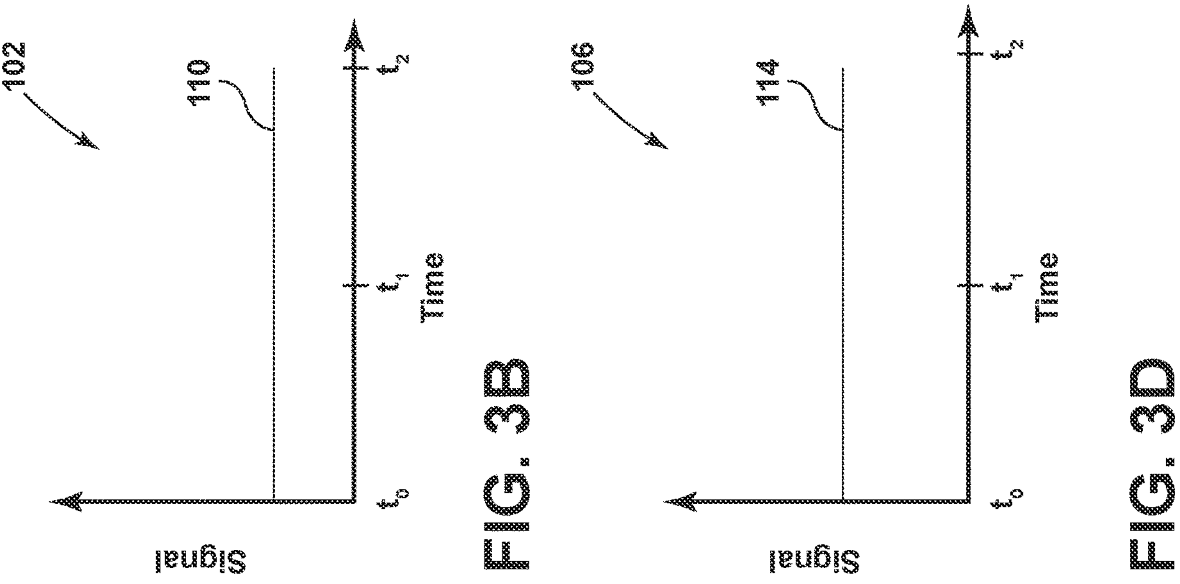
FIG. 3B
FIG. 3D
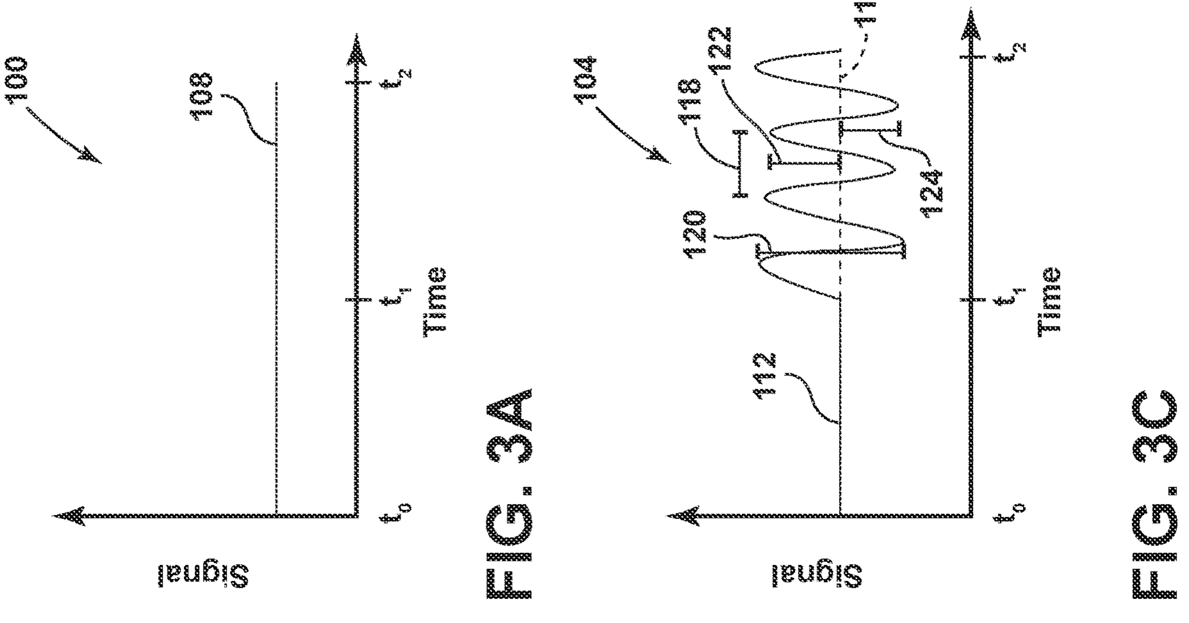
FIG. 3A
FIG. 3C

HYDRAULIC DRIVE SYSTEM AND METHODS FOR AN AGRICULTURAL VEHICLE

FIELD OF THE INVENTION

The present subject matter relates generally to vehicles that may include a hydraulic propulsion pump that is configured to generate power through a flow of hydraulic fluid to provide motive force for the vehicle.

BACKGROUND OF THE INVENTION

One type of agricultural vehicle may be a combine harvester, or a combine, which may be used to harvest crops. In general, the combine may complete several processes, which traditionally were distinct, in one pass of the machine over a particular part of the field. Among the crops that may be harvested with a combine are rice, wheat, oats, rye, barley, corn, soybeans, flax or linseed, and others. Waste or material other than grain (MOG) may be discharged from the vehicle and can include the remaining dried stems and leaves of the crop which may be, for example, chopped and spread on the field as residue or baled for feed and bedding for livestock.

During operation, the combine may slip, such as when the field is saturated, due to a loss of traction. As such, an improved system and method for sustaining static/rolling friction over kinetic/slip friction that may increase the amount of traction available to a driveline system would be welcomed in the technology.

BRIEF DESCRIPTION OF THE INVENTION

Aspects and advantages of the technology will be set forth in part in the following description, or may be obvious from the description, or may be learned through practice of the technology.

In some aspects, the present subject matter is directed to a drive system for an agricultural vehicle. The drive system can include a chassis and a power plant operably coupled with the chassis. A pump unit is connected to the power plant and configured to generate power through a flow of hydraulic fluid. A first tractive element is operably coupled with the chassis. A first propulsion motor is fluidly coupled with the pump unit and configured to drive a first tractive force to the first tractive element by applying a first control signal proportional to a defined displacement to a first control signal line. A sensor system is configured to capture data indicative of a slip condition of the first tractive element. A computing system is operably coupled with the sensor system and the first propulsion motor. The computing system includes a processor and associated memory, the memory storing instructions that, when implemented by the processor, configure the computing system to detect the slip condition of the first tractive element based on the data from the sensor system and provide a superimposed traction signal to the first tractive element to alter a displacement to the first control signal line.

In some aspects, the present subject matter is directed to a method for operating a drive system of an agricultural vehicle. The method includes receiving, from a sensor system, data indicative of a slip condition of a tractive element. The method also includes detecting, with a computing system, the slip condition. The method further includes generating, with the computing system, a superimposed traction signal to a control signal line fluidly coupled with a propulsion motor to alter a displacement of the propulsion motor. Lastly, the method includes providing, through a hydraulic circuit, fluid flow to the control signal line based on the superimposed traction signal.

In some aspects, the present subject matter is directed to a drive system for an agricultural vehicle. The drive system includes a chassis and a power plant operably coupled with the chassis. A pump unit is connected to the power plant and configured to generate power through a flow of hydraulic fluid. A first tractive element is operably coupled with the chassis. A first propulsion motor is fluidly coupled with the pump unit and configured to drive a first tractive force to the first tractive element by applying a first control signal proportional to a defined displacement to a control signal line. A second tractive element is operably coupled with the chassis. A second propulsion motor is fluidly coupled with the pump unit and configured to drive a second tractive force to the second tractive element by applying a second control signal proportional to a defined displacement to a second control signal line. A sensor system is configured to capture data indicative of a slip condition of the first tractive element or the second tractive element. A computing system is operably coupled with the sensor system, the first propulsion motor, and the second propulsion motor. The computing system includes a processor and associated memory, the memory storing instructions that, when implemented by the processor, configure the computing system to detect a slip condition of the first tractive element or the second tractive element based on the data from the sensor system, generate a superimposed traction signal to a first control signal line fluidly coupled with a first propulsion motor to alter a displacement of the first propulsion motor, and provide fluid flow to the first control signal line based on the superimposed traction signal through a hydraulic circuit.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIGS. 3A-3D and control signal graphs over time for four separate tractive elements operably coupled with the vehicle in accordance with aspects of the present subject matter.

Figure 1:
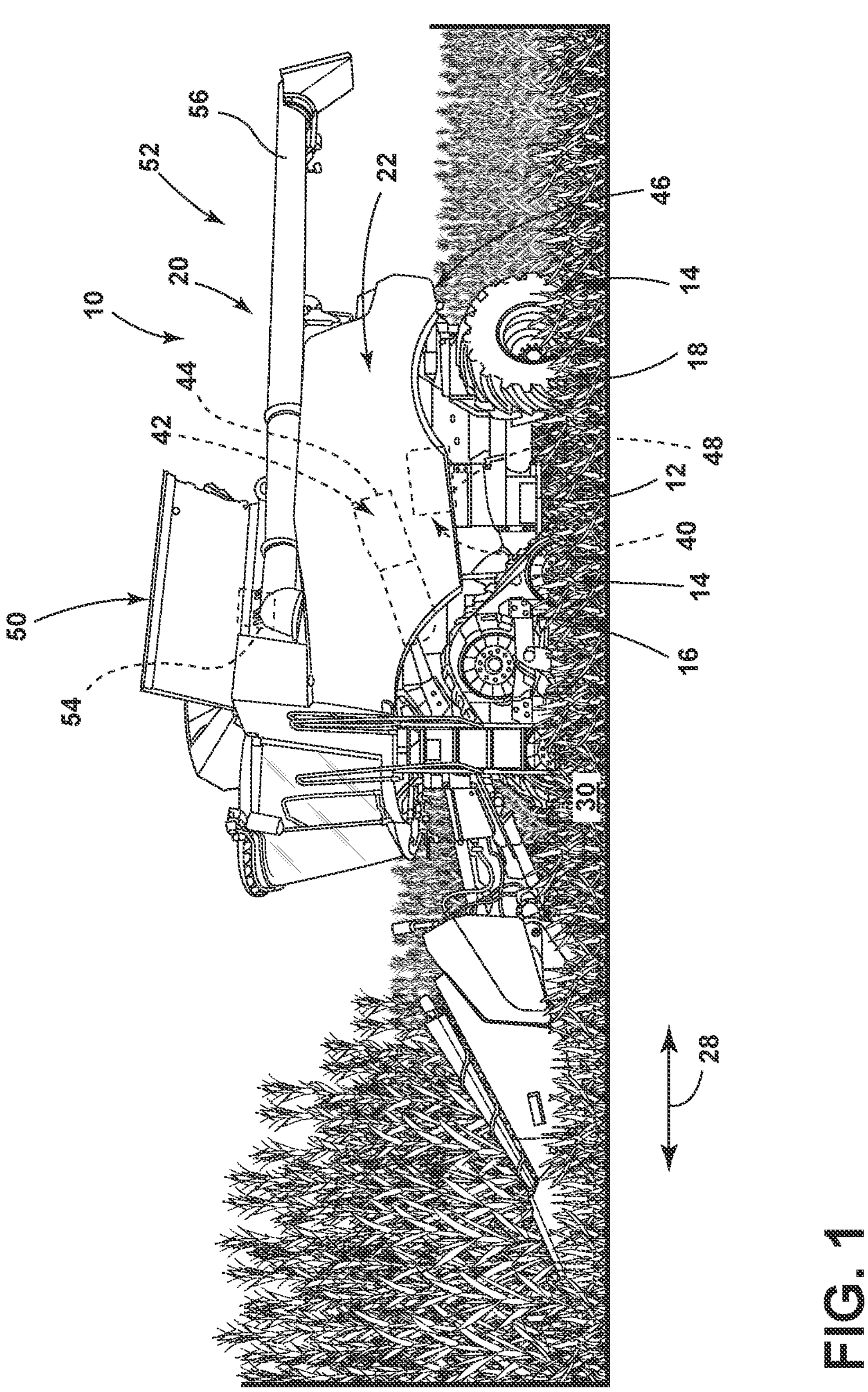
FIG. 1 illustrates a perspective view of an agricultural vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations may be made in the present disclosure without departing from the scope or spirit of the disclosure. For instance, features illustrated or described as part may be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected" or "operably coupled" to each other to achieve the desired functionality, and any two components capable of being so associated may also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items may be employed by itself, or any combination of two or more of the listed items may be employed. For example, if a composition or assembly is described as containing components A, B, and/or C, the composition or assembly may contain A alone; B alone; C alone; A and B in combination; A and C in combination; B and C in combination; or A, B, and C in combination.

In general, a drive system for an agricultural vehicle is provided herein that may include a chassis and a power plant operably coupled with the chassis. A pump unit may be connected to the power plant and configured to generate power through a flow of hydraulic fluid.

A first tractive element may be operably coupled with the chassis. A first propulsion motor may be fluidly coupled with the pump unit and may be configured to drive a first tractive force to the first tractive element by applying a first control signal proportional to a defined displacement to a control signal line. Likewise, a second tractive element may be operably coupled with the chassis. A second propulsion motor may be fluidly coupled with the pump unit and may be configured to drive a second tractive force to the second tractive element by applying a second control signal proportional to a defined displacement to a second control signal line.

A sensor system may be configured to capture data indicative of a slip condition of the first tractive element or the second tractive element. A computing system may be operably coupled with the sensor system, the first propulsion motor, and the second propulsion motor. The computing system may include a processor and associated memory. The memory may store instructions that, when implemented by the processor, configure the computing system to detect a slip condition of the first tractive element or the second tractive element based on the data from the sensor system, generate a superimposed traction signal to a first control signal line fluidly coupled with a first propulsion motor to alter a displacement of the first propulsion motor and provide fluid flow to the first control line based on the superimposed traction signal through a hydraulic circuit to sustain or increase the amount of static/rolling friction by superimposing a control signal on a propulsion motor to control to a tractive element that may be identified to be in a kinetic/slip friction scenario. As used herein, the superimposed traction signal may be a supplementary control signal that may or may not use the original control signal as a reference line. As such, the superimposed traction signal may be any signal that alters a displacement of a propulsion motor due to an input, such as a slip condition of a tractive element. "Slipping" is defined as the tractive element not turning at the same speed as the vehicle is moving across the ground. Not all slips may be bad, however. In agricultural tractors, for example, a certain limited amount of slip permits each tractive element to transfer more power to the ground. Thus, "reducing slip" should not be understood as eliminating it, since a residual slip may be beneficial.

Figure 2:
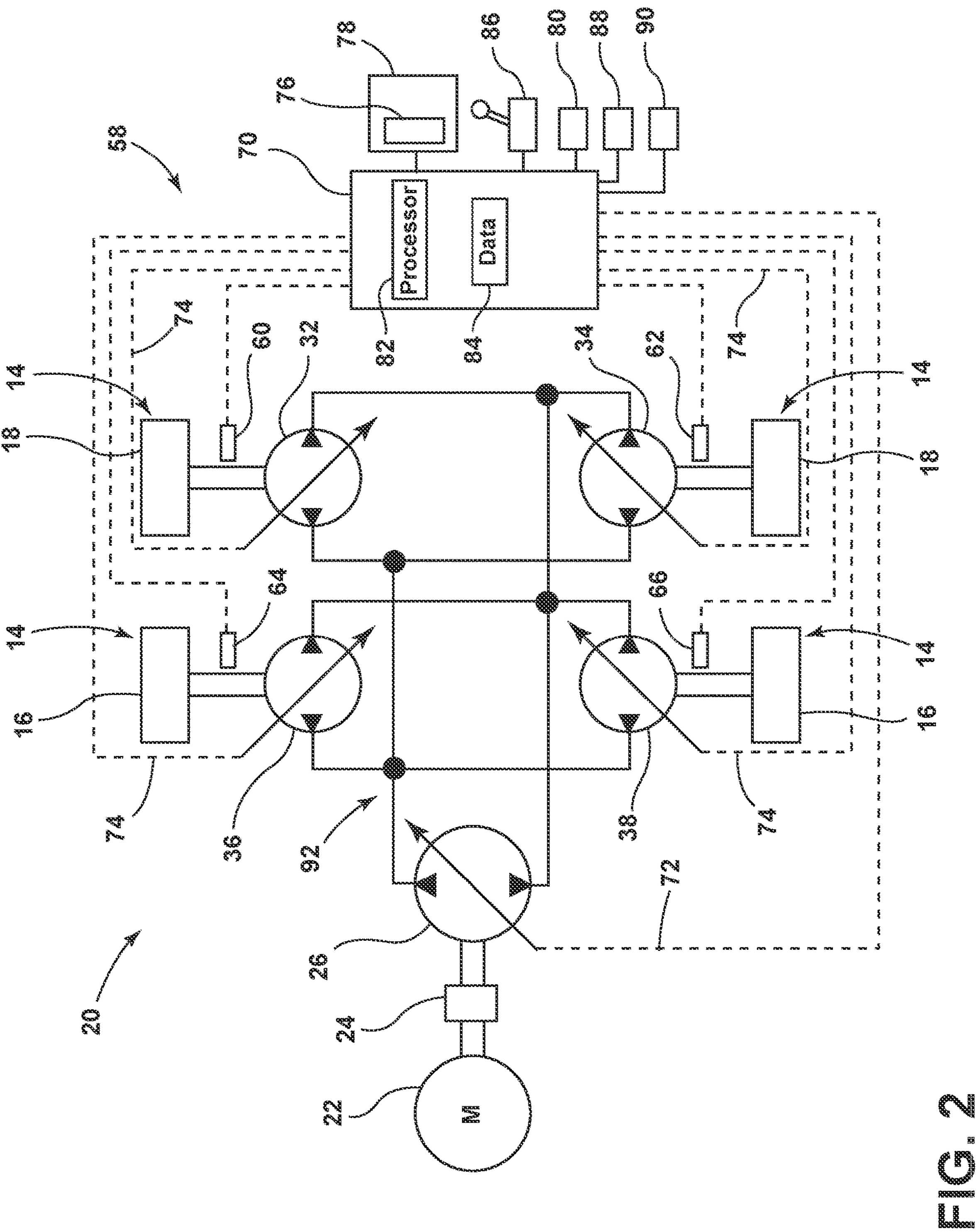
FIG. 2 illustrates a side view of the vehicle in accordance with aspects of the present subject matter.

Referring now to FIGS. 1 and 2, a vehicle 10 is generally illustrated as a self-propelled agricultural combine. However, in alternate embodiments, the vehicle 10 may be configured as any other suitable type of vehicle 10 configured to perform agricultural operations, such as a tractor or other vehicle configured to haul or tow an application implement, or any other type of vehicle.

In various embodiments, the vehicle 10 may include a chassis 12 configured to support or couple to a plurality of components. For example, one or more tractive elements 14 may be operably coupled with the chassis 12. As illustrated, the tractive elements 14 may include a pair of front track assemblies 16 and a pair of rear wheel assemblies 18 each coupled to the chassis 12. While the tractive elements 14 are illustrated as a pair of front track assemblies 16 and a pair of rear wheel assemblies 18, the vehicle 10 may have any other combination of track assemblies 16 and/or wheel assemblies 18 without departing from the scope of the present disclosure.

The vehicle 10 may further include a drive system 20 that can include a power plant 22, such as an engine, a motor, or a hybrid engine-motor combination, a gearbox 24 configured to transmit power from the power plant 22 to the tractive elements 14 via a hydrostatic the pump unit 26 to move the vehicle 10 in a direction of travel (e.g., as indicated by arrow 28 in FIG. 1) across a field 30. In some cases, the pair of front track assemblies 16 are mounted on opposing sides of a vehicle centerline of the vehicle 10 and may be driven by corresponding propulsion motors 32, 34 that are each operably coupled with the pump unit 26. Similarly, the pair of rear wheel assemblies 18 may be mounted on opposing sides of the vehicle centerline of the vehicle 10 and may be driven by corresponding propulsion motors 36, 38 that are each operably coupled with the pump unit 26. However, in some examples, a first pair of tractive elements 14 may be operably coupled with a front axle and/or a second set of tractive elements 14 may be operably coupled with a rear axle. In such instances, a first propulsion motor 32, 34 may be operably coupled with the first axle and configured to drive the tractive elements 14 coupled thereto and/or a second propulsion motor 36, 38 may be operably coupled with the second axle and configured to drive the tractive elements 14 coupled thereto.

As illustrated, the vehicle 10 may include a threshing and separating system 40 that may include a rotor 42 and one or more concaves 44. The rotor 42 may be enclosed by and rotatable within the concaves 44. The crop material may be threshed and separated by the rotation of the rotor 42 within the concaves 44. Larger elements, such as stalks, leaves, and the like may be discharged to a residue system 46 for eventually discharging out of the vehicle 10. Smaller elements of crop material, including grain and non-grain crop material, and particles lighter than grain, such as chaff, dust, and straw, may be discharged through the perforations of the concaves 44. The rotor 42 of the threshing and separating system 40 may be a transverse or axial rotor.

As the crop material is processed through the threshing and separating system 40, grain may be directed towards the cleaning system 48. In other words, the cleaning system 48 may be positioned downstream of the threshing and separating system 40 in a direction of crop material flow. The cleaning system 48 may include a grain auger trough, a pre-cleaning sieve, an upper sieve (also known as a chaffer sieve or sieve assembly), a lower sieve (also known as a cleaning sieve), and/or a cleaning fan. In operation, the fan may blow an airstream through the sieves to remove chaff and other impurities such as dust from the grain by making this material airborne for discharge out of the vehicle 10. The cleaning system 48 may also include a clean grain auger and a grain elevator so that the clean grain may be transported to a grain tank 50. Further, the cleaning system 48 may include a return auger to return the crop material to the upstream end portion of the cleaning system 48 for repeated cleaning action.

The residue system 46 may include a spreader and/or an exit guide panel that directs the discharged MOG onto the field 30. In some cases, the residue system 46 includes a pair of spreaders. The spreaders may be designed and function as any desired spreader.

An unloading system 52 may include a grain tank auger 54 located at a bottom portion of the grain tank 50 and an unloading auger 56. The grain tank auger 54 may convey the clean grain within grain tank 50 into the unloading auger 56. The unloading auger 56 may be placed over a discharge container in order for the clean grain to be unloaded and transported by a transport vehicle.

Referring further to FIG. 2, the drive system 20 can include the four variable displacement propulsion motors 32, 34, 36, 38 that may be connected in parallel to the pump unit 26. In addition, the drive system 20 may further include a computing system 70 that may be operably coupled with the power plant 22, the pump unit 26, the propulsion motors 32, 34, 36, 38, a sensor system 58, and/or any other component.

The pump unit 26 may be configured as a bidirectional pump that has a variable displacement. Its displacement may be varied electronically by applying a control signal proportional to the defined displacement to a pump unit signal line 72. The pump unit signal line 72 may be coupled to and between the computing system 70 and the pump unit 26. The computing system 70 may be configured to generate a control signal and apply that signal to the pump unit signal line 72 to change the specific displacement of the pump unit 26. In some cases, the computing system 70 may generate a control signal in which the magnitude of the current may be proportional to the defined displacement of the pump unit 26. The computing system 70 can apply this signal to the pump unit signal line 72 and the pump unit 26 responsively changes its specific displacement.

The propulsion motors 32, 34, 36, 38 may be respectively coupled to and drive the traction elements 14. The propulsion motors 32, 34, 36, 38 may be configured as positive displacement motors having a variable specific displacement. Each propulsion motor 32, 34, 36, 38 may be operably coupled with a signal line 74 that may be further coupled to and between that propulsion motor 32, 34, 36, 38 and the computing system 70. The computing system 70 may transmit a control signal indicative of a defined motor displacement to each propulsion motor 32, 34, 36, 38 over its associated signal line 74. Upon receipt of this signal, the propulsion motor 32, 34, 36, 38 responsively changes its specific displacement.

A hydraulic circuit 92 coupling the propulsion motors 32, 34, 36, 38 and the pump unit 26 may be a series/parallel circuit. Each propulsion motor 32, 34, 36, 38 may be coupled in series to the pump unit 26 to form an individual series hydraulic circuit 92, such that fluid from the pump outlet passes into a hydraulic fluid inlet of the propulsion motor 32, 34, 36, 38, through that propulsion motor 32, 34, 36, 38, out the hydraulic fluid outlet of the propulsion motor 32, 34, 36, 38, and back into the hydraulic fluid inlet of the pump unit 26. This relationship may be true of all the propulsion motors 32, 34, 36, 38 with respect to the pump unit 26. At the same time, the propulsion motors 32, 34, 36, 38 are connected in parallel with each other. The hydraulic fluid inlets of all the propulsion motors 32, 34, 36, 38 are coupled together and fed in common by the hydraulic fluid outlet of the pump unit 26, and the hydraulic fluid outlets of all the propulsion motors 32, 34, 36, 38 are coupled together to form a common return line to the hydraulic fluid inlet of the pump unit 26. The terms “inlet” and “outlet” are figurative since the flow may change direction. Thus, an inlet with flow in one direction would become an outlet when flow travels in the other direction.

In some cases, the computing system 70 may be configured to detect a slip condition of one or more ground-engaging motive assemblies and, in turn, generate a superimposed traction signal (e.g., a high-frequency control signal), and provide the superimposed traction signal to the axle and/or the tractive element 14 experiencing the detected slip condition to increase the amount of static/rolling friction available to the axle and/or the tractive element 14 experiencing the detected slip condition. Moreover, in some cases, the system may receive data indicative of a steering angle and, in turn, determine any wavelength, amplitude, or crest relative to a reference line, and/or trough relative to a reference line of the superimposed traction signal. Additionally or alternatively, the system may receive data indicative of any environmental condition and, in turn, determine a wavelength, an amplitude, a crest relative to a reference line, and/or a trough relative to a reference line of the superimposed traction signal.

In general, the computing system 70 may correspond to any suitable processor-based device, such as a computing device or any suitable combination of computing devices. Thus, in several examples, the computing system 70 may include one or more processor(s) 82 and the associated memory device(s) 84 configured to perform a variety of computer-implemented functions. As used herein, the term “processor” refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 84 of the computing system 70 may generally comprise memory element(s) including, but not limited to, computer-readable medium (e.g., random access memory (RAM)), computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 84 may generally be configured to store suitable computer-readable instructions that, when implemented by the processor(s) 82, configure the computing system 70 to perform various computer-implemented functions, such as any methods and/or other automated functions described herein. In addition, the computing system 70 may also include various other suitable components, such as a communications circuit or module, one or more input/output channels, a data/control bus, and/or the like.

It will be appreciated that the computing system 70 may correspond to an existing controller of the agricultural vehicle 10 or the computing system 70 may correspond to a separate processing device. For instance, in several examples, the computing system 70 may form all or part of a separate plug-in module that may be installed within the agricultural vehicle 10 to allow for the disclosed drive system 20 to be implemented without requiring additional software to be uploaded onto existing control devices of the vehicle 10.

The sensor system 58 may be operably coupled with various components of the drive system 20. For example, speed sensors 60, 62, 64, 66 may be respectively coupled to the propulsion motors 32, 34, 36, 38 to generate data indicative of a traction element operating speed and/or ground speed. The speed sensors 60, 62, 64, 66 may provide a speed signal indicative of the speed of their associated traction elements or propulsion motors 32, 34, 36, 38 to the computing system 70. In some examples, the sensors 60, 62, 64, 66 may generate a speed signal that is proportional to the speed of rotation of their associated track assemblies 16 or traction elements (or propulsion motors 32, 34, 36, 38) and transmit that signal to the computing system 70. In various examples, the sensors may be integral to the propulsion motors 32, 34, 36, 38 and generate a train of data (e.g., electrical pulses) with each such data being indicative of a predetermined fractional rotation of the propulsion motor 32, 34, 36, 38. As the propulsion motor 32, 34, 36, 38 rotates at a higher velocity, the rate at which the pulses are generated and transmitted to the computing system 70 increases proportionately.

Additionally or alternatively, the sensor system 58 can include a steering sensor 76 (e.g., a torque sensor, a steering angle sensor, or any other suitable type of sensor) within a steering system 78 and configured to capture data related to an instantaneous steering direction of the vehicle 10 and/or data related to a torque on a steering wheel indicating a user’s intention for manipulating the steering system 78.

Additionally or alternatively, the sensor system 58 may include one or more operation condition sensors 80 that are configured to capture data indicative of one or more field conditions, such as moisture content of the soil within the field 30, soil flow within the field 30, soil compaction within the field 30, soil structure within the field 30, soil texture within the field 30, depth of a trench within the field 30, among others.

Additionally or alternatively, the sensor system 58 may include a ground speed sensor 88 (such as a RADAR), and/or a transmission pickup sensor may be configured to generate data that is related to a vehicle ground speed. For instance, the ground speed radar may emit radar signals at the ground over which the vehicle 10 is traveling, and, in turn, receive reflections of these emitted radar signals. The emitted and received signals may be used to calculate a chassis ground speed based upon the time elapsed between the emission of the radar signals and reception of the reflected signals. The transmission pickup sensor may measure a rotational velocity of the output shaft of the drive system 20 of the vehicle 10. In turn, a chassis ground speed corresponding to the rotational velocity of the output shaft may be calculated based on the assumption that there is no slippage between the traction elements of the vehicle 10 and the field 30 being traveled over. However, in some instances, a variance between the two sensors and/or a variance between any other two speed sensors may be indicative of a slippage event. Additionally or alternatively, the computing system 70 may derive the actual chassis speed using an internal reference, such as a mathematical model of the vehicle 10. In such instances, the computing system 70 is configured to determine the speed of the vehicle 10 by deriving it from one or more of the speed sensors.

Additionally or alternatively, a location sensor 90 may be configured to determine a position of the vehicle 10, which in turn may be used to determine a speed of the vehicle 10. In various examples, the location sensor 90 may be configured as a satellite navigation positioning device (e.g. a GPS, a Galileo positioning system, a Global Navigation satellite system (GLONASS), a BeiDou Satellite Navigation and Positioning system, a dead reckoning device, and/or the like) to determine the location of the vehicle 10.

With further reference to FIG. 2, a command speed input device 86 may be operably coupled to the computing system 70 and is manually operable by the machine operator to change the command speed of the vehicle 10. The input device 86 may be a quadrant lever, a switch, or a plurality of switches, and may include a shaft encoder, a potentiometer, or the like to indicate to the computing system 70 that the operator desires to change the commanded speed. When the operator manipulates input device 86, the computing system 70 senses a change in the control signal generated by the input device 86 and changes the commanded speed accordingly.

In operation, a chassis speed may be defined by an input device 86 as a first input and an actual chassis speed, as determined based on data from the sensor system 58, as a second input. These two inputs are combined to determine an outputted control signal for the pump unit 26 to vary a pump displacement of the pump unit 26 and/or an outputted control signal for each of the propulsion motors 32, 34, 36, 38 to vary a displacement of each respective propulsion motor 32, 34, 36, 38 accordingly. As the vehicle 10 speeds up or slows down, the reference or actual speed changes, and, in turn, the computing system 70 calculates a different displacement setting for each propulsion motor 32, 34, 36, 38 and/or the pump unit 26. This revised displacement setting is applied as an electrical signal on any respective pump unit signal line 72 and/or control signal line 74 extending from the computing system 70 to the propulsion motor 32, 34, 36, 38 and/or the pump unit 26 to vary its displacement.

In various examples, the computing system 70 may include a lookup table that is referenced by the processor of the computing system 70 to retrieve the default pump displacement signal for the pump unit 26 and/or each of the propulsion motors 32, 34, 36, 38 that corresponds to the operator-commanded speed. When the operator changes the speed, the computing system 70 may use the lookup table to determine a corresponding, subsequent control signal. This signal represents the displacement setting of the pump unit 26 and/or the propulsion motors 32, 34, 36, 38. The computing system 70 then applies this signal to the pump unit 26 and/or the respective propulsion motor 32, 34, 36, 38. In turn, the pump unit 26 and/or the respective propulsion motor 32, 34, 36, 38 is set to the commended displacement.

In some examples, each tractive element 14 is equipped with a speed sensor 60, 62, 64, 66 that generates data indicative of the speed of rotation of the tractive element 14. The computing system 70 may monitor the speed of rotation of each tractive element 14, compare it with the actual speed of the vehicle 10, and use this comparison to determine whether a slip condition is detected. As used herein, "slippage" means the difference between a tractive element's rotational speed (the ground speed that should result from a tractive element 14 rotating at the rotational speed) with the ground speed of the vehicle 10. For instance, when the tractive element 14 rotates with slippage, a speed difference between an actual speed of the vehicle 10 and the speed of the tractive element 14 may deviate from a defined range. If there is no tractive element slippage, the signal generated by comparison may be zero and/or within a defined range. However, the slip condition may additionally or alternatively be detected through any other manner.

To control slippage, the computing system 70 may generate a superimposed traction signal and provide the superimposed traction signal for the respective propulsion motor 32, 34, 36, 38 associated with the tractive element 14 that is experiencing a slip condition. In various examples, the generation of a superimposed traction signal may be initiated based on a user input and/or by the computing system 70 without user input, such as when a traction element slip deviates from a defined range, as detected based on data form the sensor system 58.

In several examples, the computing system 70 may sense the slippage of one or more tractive elements 14 and generate a superimposed traction signal. For instance, with regard to FIGS. 3A-3D, a control signal graph 100, 102, 104, 106 for each tractive element 14 is respectively illustrated according to some examples of the present disclosure. In the illustrated example, a first graph 100 (FIG. 3A) may illustrate a control signal 108 of a first tractive element 14 from time $t_0$ to $t_2$, a second graph 102 (FIG. 3B) may illustrate a control signal 110 of a second tractive element 14 from time $t_0$ to $t_2$, a third graph 104 (FIG. 3C) may illustrate a control signal 112 of a third tractive element 14 from time $t_0$ to $t_2$, and a fourth graph 106 (FIG. 3D) may illustrate a control signal 114 of a fourth tractive element 14 from time $t_0$ to $t_2$. Moreover, in the illustrated example, the third tractive element 14 may experience a slip condition, as detected by the computing system 70 based on data provided by the sensor system 58, through a user input, etc. Based on the detection of the slip condition, the computing system 70 may generate a superimposed traction signal to a control signal line 74 (FIG. 2) fluidly coupled with the third propulsion motor 38 to alter a displacement of the third propulsion motor 38 (FIG. 2) and provide fluid flow to the control line 74 (FIG. 2) based on the superimposed traction signal through a hydraulic circuit 92 to increase the amount of static/rolling friction available to the third tractive element 14 (or an axle operably coupled to the tractive element 14) experiencing the detected slip condition. In some cases, the superimposed traction signal may be sinusoidal about a reference line 116, which may be generally commensurate with the original control signal and/or varied from the control signal. Moreover, in some cases, a wavelength 118, an amplitude 120, a crest 122 relative to a reference line 116, and/or a trough 124 relative to a reference line 116 of the superimposed traction signal may be defined by one or more look-up tables and/or through machine learning methods and algorithms that utilize one or several machine learning techniques including, for example, decision tree learning, including, for example, random forest or conditional inference trees methods, neural networks, support vector vehicles, clustering, and Bayesian networks. These algorithms may include computer-executable code that may be retrieved by the computing system 70 and/or through a network/cloud and may be used to evaluate and update the superimposed traction signal. In some instances, the machine learning engine may allow for changes to the boom deflection model to be performed without human intervention.

Additionally or alternatively, the superimposed traction signal may be defined in part based on one or more operating parameters. In various examples, the one or more operating parameters may include a detected steering angle based on data from the steering angle sensor, an environmental condition, and/or any other parameter.

In various examples, the computing system 70 may be further configured to manipulate a steering angle of the steering assembly based on the detected slip condition, and/or actuate any other vehicular system based on the detected slip condition. In such instances, the computing system 70 may be configured to rotate a steering assembly in a defined manner to assist in mitigating the slip condition of the tractive element 14.

In various examples, the computing system 70 may be configured to determine and detect a slip condition of each tractive element 14 based on the data from the sensor system 58 and provide a superimposed traction signal to that respective tractive element 14 to alter a displacement of a propulsion motor 32, 34, 36, 38 associated with that tractive element 14 independently for each tractive element 14 and propulsion motor 32, 34, 36, 38 combination. In various examples, there may be a single propulsion motor displacement lookup table, or there may be multiple lookup tables, one for each tractive element 14 and propulsion motor pair, depending upon the type of propulsion motors, and the size of the tractive elements 14, for example.

When the speed of the slipping tractive element 14 responds to the alteration(s) in propulsion motor torque and again engages the ground, the difference between the actual chassis speed and the speed of the tractive element 14 may return the defined range, and the secondary propulsion motor displacement signal likewise may cease. The result is that the specific displacement of the propulsion motor 32, 34, 36, 38 driving the formerly slipping tractive element 14 increases, and approaches the default value.

Figure 4:
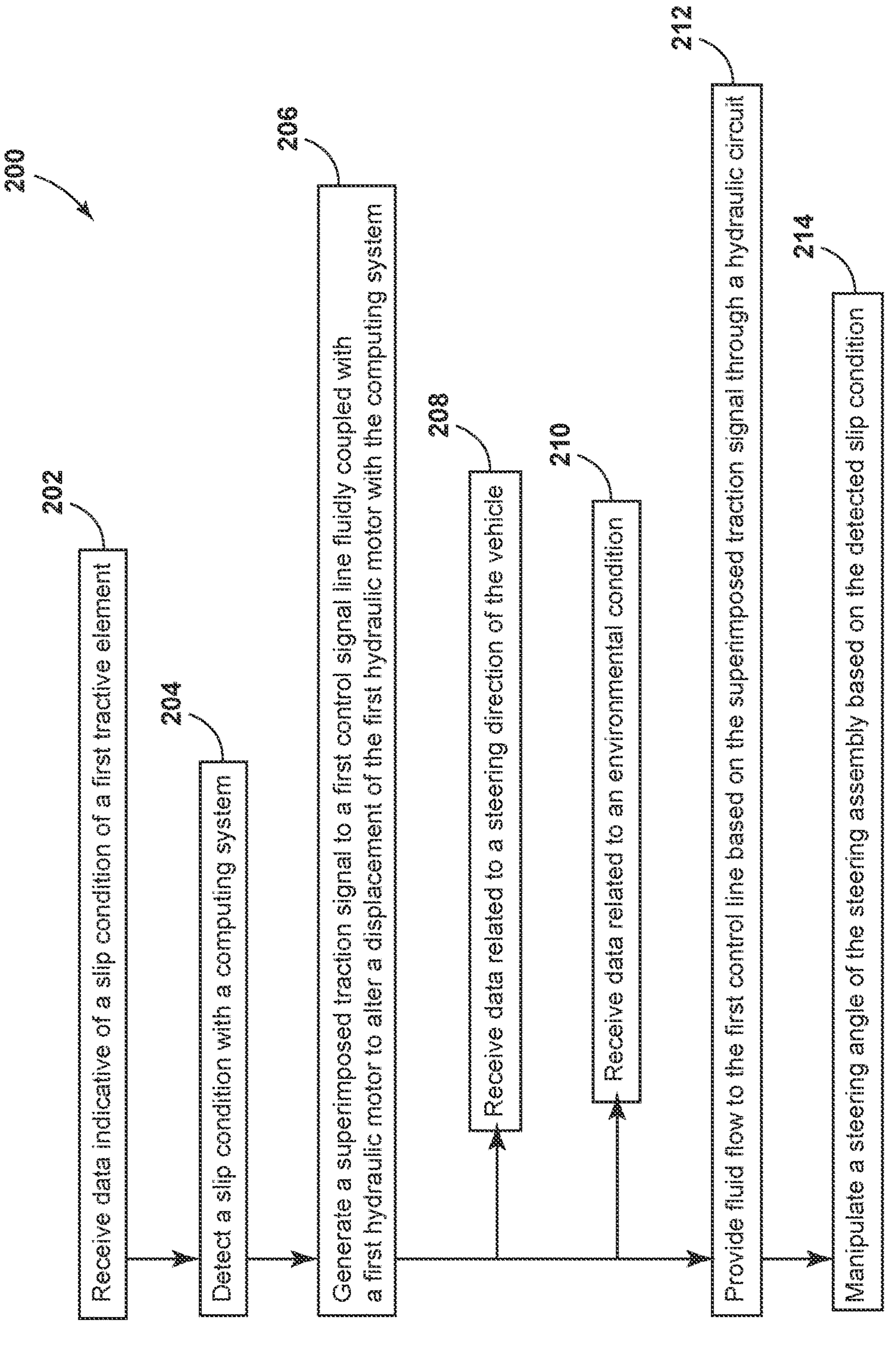
FIG. 4 illustrates a flow diagram of a method for operating an agricultural drive system in accordance with aspects of the present subject matter.

Referring now to FIG. 4, a method 200 of operating a drive system of an agricultural vehicle is illustrated in accordance with aspects of the present subject matter. In general, the method 200 will be described herein with reference to the vehicle 10 described above with reference to FIGS. 1-3. However, the disclosed method 200 may generally be utilized with any suitable harvesting assembly. In addition, although FIG. 4 depicts steps performed in a particular order for purposes of illustration and discussion, the methods discussed herein are not limited to any particular order or arrangement. One skilled in the art, using the disclosure provided herein, will appreciate that various steps of the methods disclosed herein may be omitted, rearranged, combined, and/or adapted in various ways without deviating from the scope of the present disclosure.

As shown in FIG. 4, at (202), the method 200 may include receiving data indicative of a slip condition of a first tractive element from a sensor system. At (204), the method 200 may include detecting the slip condition with a computing system. In some cases, the sensor system may include a speed sensor operably coupled with the first tractive element and a ground speed sensor, and the slip condition may be detected based on a difference in speed between a detected tractive element speed from the first speed sensor relative to a chassis speed from the ground speed sensor.

At (206), the method 200 may include generating a superimposed traction signal to a first control signal line fluidly coupled with a first propulsion motor to alter a displacement of the first propulsion motor with the computing system. In some cases, the superimposed traction signal may be defined in part based on one or more operating parameters. For example, at (208), the method 200 may include receiving data related to a steering direction of the vehicle from the sensor system. In such instances, the superimposed traction signal is based in part on the detected steering angle. Additionally or alternatively, at (210), the method 200 may include receiving data related to an environmental condition from the sensor system. In such instances, the superimposed traction signal is based in part on the environmental condition.

At (212), the method 200 may include providing fluid flow to the first control line based on the superimposed traction signal through a hydraulic circuit. Additionally or alternatively, at (214), the method 200 may include manipulating a steering angle of the steering assembly based on the detected slip condition with the computing system.

In various examples, the method 200 may implement machine learning methods and algorithms that utilize one or several machine learning techniques including, for example, decision tree learning, including, for example, random forest or conditional inference trees methods, neural networks, support vector vehicles, clustering, and Bayesian networks. These algorithms may include computer-executable code that may be retrieved by the computing system and/or through a network/cloud and may be used to evaluate and update the boom deflection model. In some instances, the machine learning engine may allow for changes to the boom deflection model to be performed without human intervention.

It is to be understood that the steps of any method disclosed herein may be performed by a computing system upon loading and executing software code or instructions that are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions that are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A drive system for an agricultural vehicle, the drive system comprising:

a chassis;

a power plant operably coupled with the chassis;

a pump unit connected to the power plant and that generates power through a flow of hydraulic fluid;

a first tractive element operably coupled with the chassis;

a first propulsion motor fluidly coupled with the pump unit and that drives a first tractive force to the first tractive element by applying a first control signal proportional to a defined displacement to a first control signal line;

a sensor system capturing data indicative of a slip condition of the first tractive element; and a computing system operably coupled with the sensor system and the first propulsion motor, the computing system including a processor and associated memory, the memory storing instructions that, when implemented by the processor, configure the computing system to:

detect the slip condition of the first tractive element based on the data from the sensor system; and generate a superimposed traction signal comprising a high-frequency sinusoidal control signal onto the first tractive element to alter a displacement to the first control signal line.

2. The drive system of claim 1, wherein the computing system further:

determines a wavelength, an amplitude, a crest relative to a reference line, or a trough relative to the reference line of the superimposed traction signal based on one or more operating parameters.

3. The drive system of claim 2, wherein the sensor system further:

captures data related to a steering direction of the chassis from a steering angle sensor, and wherein the one or more operating parameters includes a detected steering angle based on data from the steering angle sensor.

4. The drive system of claim 2, wherein the sensor system further:

captures data related to an environmental condition, and wherein the one or more operating parameters includes the environmental condition.

5. The drive system of claim 1, further comprising:

a second tractive element operably coupled with the chassis; and a second propulsion motor fluidly coupled with the pump unit and driving a second tractive force to the second tractive element by applying a second control signal proportional to a defined displacement to a second control signal line, wherein the sensor system captures data indicative of a slip condition of the second tractive element, and wherein the computing system detects the slip condition of the second tractive element based on the data from the sensor system and provide the superimposed traction signal to the second tractive element to alter a displacement to the second control signal line.

6. The drive system of claim 5, wherein one of the first tractive element or the second tractive element is a track assembly.

7. The drive system of claim 6, wherein one of the first tractive element or the second tractive element is a wheel assembly.

8. The drive system of claim 5, wherein the second control signal is provided to a second control signal line operably coupled with the second tractive element while the superimposed traction signal is provided to the first control signal line to alter the displacement of a propulsion motor operably coupled with the first tractive element.

9. The drive system of claim 1, wherein the sensor system includes a first speed sensor operably coupled with the first tractive element and a ground speed sensor, and the slip condition is detected based on a difference in speed between a detected tractive element speed from the first speed sensor relative to a chassis speed from the ground speed sensor.

10. A method for operating a drive system of an agricultural vehicle, the method comprising:

receiving, from a sensor system, data indicative of a slip condition of a tractive element;

detecting, with a computing system, the slip condition;

generating, with the computing system, a high-frequency sinusoidal traction signal and superimposing the high-frequency sinusoidal traction signal onto a primary control signal provided to a control signal line fluidly coupled with a propulsion motor to alter a displacement of the propulsion motor, wherein the high-frequency sinusoidal traction signal comprises a waveform having a wavelength, an amplitude, and a crest-to-trough variation that modulates the displacement of the propulsion motor while maintaining partial slip to preserve tractive efficiency; and providing, through a hydraulic circuit, fluid flow to the control signal line based on the superimposed traction signal.

11. The method of claim 10, further comprising:

receiving, from the sensor system, data related to a steering direction of a chassis, wherein the superimposed traction signal is based in part on a detected steering angle.

12. The method of claim 10, further comprising:

receiving, from the sensor system, data related to an environmental condition, wherein the superimposed traction signal is based in part on the environmental condition.

13. The method of claim 10, wherein the sensor system includes a speed sensor operably coupled with the tractive element and a ground speed sensor, and the slip condition is detected based on a difference in speed between a detected tractive element speed from the speed sensor relative to a chassis speed from the ground speed sensor.

14. The method of claim 10, further comprising:

manipulating, with the computing system, a steering angle of a steering assembly based on the detected slip condition.

15. A drive system for an agricultural vehicle, the drive system comprising:

a chassis;

a power plant operably coupled with the chassis;

a pump unit connected to the power plant and generating power through a flow of hydraulic fluid;

a first tractive element operably coupled with the chassis;

a first propulsion motor fluidly coupled with the pump unit and driving a first tractive force to the first tractive element by applying a first control signal proportional to a defined displacement to a control signal line;

a second tractive element operably coupled with the chassis;

a second propulsion motor fluidly coupled with the pump unit and driving a second tractive force to the second tractive element by applying a second control signal proportional to a defined displacement to a second control signal line;

a sensor system capturing data indicative of a slip condition of the first tractive element or the second tractive element; and a computing system operably coupled with the sensor system, the first propulsion motor, and the second propulsion motor, the computing system:

detecting a slip condition of the first tractive element or the second tractive element based on the data from the sensor system;

generating and superimposing a high-frequency sinusoidal traction signal onto a primary control signal provided to a first control signal line fluidly coupled with a first propulsion motor to alter a displacement of the first propulsion motor; and providing fluid flow to the first control signal line based on the superimposed traction signal through a hydraulic circuit, wherein the high-frequency sinusoidal traction signal comprises a waveform having a wavelength, an amplitude, and a crest-to-trough variation that modulates the displacement of the first propulsion motor while maintaining partial slip to preserve tractive efficiency.

16. The drive system of claim 15, wherein the sensor system includes a first speed sensor operably coupled with the first tractive element and a ground speed sensor, and the slip condition is detected based on a difference in speed between a detected tractive element speed from the first speed sensor relative to a chassis speed from the ground speed sensor.

17. The drive system of claim 15, wherein the computing system determines a wavelength, an amplitude, a crest relative to a reference line, or a trough relative to the reference line of the superimposed traction signal based on one or more operating parameters.

18. The drive system of claim 17, wherein the sensor system captures data related to a steering direction of the chassis, and wherein the one or more operating parameters includes a detected steering angle based on data from the steering angle sensor.

19. The drive system of claim 17, wherein the sensor system further captures data related to an environmental condition, and wherein the one or more operating parameters includes the environmental condition.

* * * * *